US007984243B2

(12) United States Patent
Kawai et al.

(10) Patent No.: US 7,984,243 B2
(45) Date of Patent: Jul. 19, 2011

(54) CACHE MEMORY AND METHOD FOR CACHE ENTRY REPLACEMENT BASED ON MODIFIED ACCESS ORDER

(75) Inventors: Hazuki Kawai, Kyoto (JP); Ryuta Nakanishi, Kyoto (JP); Tetsuya Tanaka, Kyoto (JP); Shuji Miyasaka, Osaka (JP)

(73) Assignee: Panasonic Corporation, Osaka (JP)

( * ) Notice: Subject to any disclaimer, the term of this patent is extended or adjusted under 35 U.S.C. 154(b) by 486 days.

(21) Appl. No.: 10/577,133

(22) PCT Filed: Nov. 2, 2004

(86) PCT No.: PCT/JP2004/016272
§ 371 (c)(1),
(2), (4) Date: Apr. 25, 2006

(87) PCT Pub. No.: WO2005/050455
PCT Pub. Date: Jun. 2, 2005

(65) Prior Publication Data
US 2008/0168232 A1  Jul. 10, 2008

(30) Foreign Application Priority Data
Nov. 18, 2003  (JP) .................... 2003-387351

(51) Int. Cl.
*G06F 12/00* (2006.01)
(52) U.S. Cl. ........ 711/133; 711/134; 711/136; 711/144; 711/154; 711/159; 711/160
(58) Field of Classification Search .................. 711/133, 711/134, 136, 144, 154, 159, 160
See application file for complete search history.

(56) References Cited

U.S. PATENT DOCUMENTS

| 4,920,478 | A |   | 4/1990 | Furuya et al. |
| 5,043,885 | A | * | 8/1991 | Robinson ................. 711/133 |
| 5,375,216 | A |   | 12/1994 | Moyer et al. |
| 5,497,477 | A | * | 3/1996 | Trull ........................ 711/133 |
| 5,546,559 | A |   | 8/1996 | Kyushima et al. |
| 6,105,115 | A | * | 8/2000 | Mathews et al. ........... 711/160 |
| 6,202,129 | B1 | * | 3/2001 | Palanca et al. ............ 711/133 |
| 6,266,742 | B1 | * | 7/2001 | Challenger et al. ....... 711/133 |
| 6,393,525 | B1 | * | 5/2002 | Wilkerson et al. ........ 711/136 |
| 6,397,298 | B1 | * | 5/2002 | Arimilli et al. ........... 711/133 |
| 6,487,638 | B2 | * | 11/2002 | Dawkins et al. .......... 711/133 |
| 6,728,838 | B2 |   | 4/2004 | Chauvel et al. |

(Continued)

FOREIGN PATENT DOCUMENTS
EP    0203601    12/1986
(Continued)

OTHER PUBLICATIONS

Tanenbaum, Andrew S., "Modern Operating Systems", 2001, Prentice-Hall, 2nd Edition, pp. 216-217.*

(Continued)

*Primary Examiner* — Sanjiv Shah
*Assistant Examiner* — Arpan P. Savla
(74) *Attorney, Agent, or Firm* — Greenblum & Bernstein, P.L.C.

(57) ABSTRACT

A cache memory according to the present invention includes a W flag setting unit that modifies order data indicating an access order per cache entry that holds a data unit of a cache so as to reflect an actual access order and a replace unit that selects a cache entry for replacement based on the modified order data and replaces the cache entry.

8 Claims, 18 Drawing Sheets

U.S. PATENT DOCUMENTS

| | | | |
|---|---|---|---|
| 6,738,865 B1 * | 5/2004 | Burton et al. | ............ 711/133 |
| 2002/0069331 A1 | 6/2002 | Chauvel et al. | |
| 2002/0152361 A1 | 10/2002 | Dean et al. | |

FOREIGN PATENT DOCUMENTS

| EP | 1182566 | 2/2002 |
|---|---|---|
| JP | 51-019453 | 2/1976 |
| JP | 61-290555 | 12/1986 |
| JP | 6-348595 | 12/1994 |
| JP | 8-069417 | 3/1996 |
| JP | 2003-200221 | 7/2003 |
| JP | 2003-223360 | 8/2003 |

OTHER PUBLICATIONS

English Language Abstract of JP 2003-200221.
English Language Abstract of JP 6-348595.
English Language Abstract of JP 61-290555.
U.S. Appl. No. 10/578,314 to Tanaka et al., filed May 4, 2006.
English Language Abstract of JP 2003-223360.
English Language Abstract of JP 8-069417.
Taiwanese Office Action dated Oct. 29, 2010 that issued with respect to corresponding Taiwanese Patent Application No. 093135224.

* cited by examiner

CACHE MEMORY AND METHOD FOR CACHE ENTRY REPLACEMENT BASED ON MODIFIED ACCESS ORDER

TECHNICAL FIELD

The present invention relates to a cache memory, and a control method thereof, for increasing a speed of a memory access of a processor.

BACKGROUND ART

In microprocessors of recent years, a cache memory with low storage capacity and high speed composed of, for example, a Static Random Access Memory (SRAM), has been installed within or in the vicinity of the microprocessor, and by storing a part of data in the cache memory, the speed of the memory access of the microprocessor is increased.

With such a computer system, in the case of a mishit during a read access or a write access from a central processing unit to the cache memory, part of data newly read-out from a main storage unit is stored as an entry (registry entry) in an empty block of the cache memory. At this time, in the case where no empty block exists, entry replacement processing is necessary. In entry replacement processing, one of a plurality of blocks is selected; the entry stored in the selected block is returned to the main storage unit, resulting in an empty block; and newly read-out data is stored in this empty block. With the abovementioned entry replacement processing, a method which selects the block with the oldest accessed data, or in other words, the Least Recently Used (LRU) decoding method, is generally employed. With this LRU decoding method, usage efficiency of the cache memory improves, and as a result, execution speed of the microprocessor increases.

Among programs processed by the microprocessor, there is a special processing in which data is infrequently accessed but processing must be carried out at high speed once started, and processing in which data is frequently accessed, but not as high an execution speed is required.

Accordingly, in order to comply with this, a freeze function is included in the cache memory, such as in the conventional art of Patent Reference 1. The freeze function is a function which copies the program that has infrequently accessed data, but must be processed at high speed once started, into the cache memory in advance, and makes that domain unrewritable. By having this function, the computer system can read out the program from the cache memory when necessary and execute the program; through this, execution time is reduced. In addition, a purge function is a function which does not save the program that has frequently accessed data but requires not as high an execution speed is required, data, and the like within the cache memory, freeing up that domain. By having this function, space is freed up in the cache memory, allowing other programs and data with high priority to be taken into the cache memory, and through this, the usage efficiency of the cache memory improves, and an overall execution time is reduced.

Patent Reference 1: Japanese Laid-Open Patent Application No. 2003-200221

DISCLOSURE OF INVENTION

Problems that Invention is to Solve

However, while the freeze function and the purge function both make holding frequently-accessed data in the cache memory and evicting infrequently-accessed data from the cache memory possible, there is a problem in that a complicated circuit is necessary to control the freeze function and the purge function.

Accordingly, an object of the present invention is to provide a cache memory that in which data that is less frequently accessed is replaced preferentially over frequently accessed data, without including a complicated circuit.

Means to Solve the Problems

To achieve the abovementioned object, a cache memory according to the present invention holds, for each cache entry, order data indicating an access order, and which replaces a cache entry that is oldest in the order, the cache entry holding unit data for caching; the cache memory includes a modification unit that modifies the order data regardless of an actual access order and a selection unit that selects, based on the modified order data, a cache entry to be replaced.

According to such a configuration, for example, by modifying the order data of infrequently accessed data to indicate oldest in order, it is possible replace the infrequently accessed data preferentially over frequently accessed data, and by modifying the order data of frequently accessed data to indicate newest or not the oldest in order, it is possible to prevent the frequently accessed data from being replaced.

Here, the modification unit may include a specifying unit that specifies a cache entry that holds data which is within an address range specified by a processor, and an oldest-ordering unit that causes the order data of the specified cache entry to become oldest in order, regardless of the actual order.

According to such a configuration, by causing a cache entry that is no longer read out or written to by the processor to be oldest in access order, the cache entry is selected first as a target for replacement. Through this, it is possible to reduce the occurrence of a cache miss caused by infrequently accessed data remaining in the cache memory.

Here, the specifying unit may include: a first conversion unit that converts a starting address of the address range to a start line address that indicates a starting line within the address range, in the case where the starting address indicates a midpoint in line data; a second conversion unit that converts an ending address of the address range to an end line address that indicates an ending line within the address range, in the case where the ending address indicates a midpoint in the line data; and a judgment unit that judges whether or not there is a cache entry that holds data corresponding to each line address from the start line address to the end line address.

According to such a configuration, the processor can specify from an arbitrary address to an arbitrary address (or an arbitrary size) as the address range, regardless of the line size and line border address of the cache memory. That is, there is no need for the processor to manage the line size and the line border address, and therefore it is possible to remove the load for managing the cache memory.

Here, the oldest-ordering unit may attach, to the order data, an oldest-order flag which indicates that the access order is oldest.

According to such a configuration, the access order is modified by indirectly attaching the W flag, without directly modifying order data indicating the access order as in the conventional LRU method; therefore, the cache memory can be realized without adding a complicated hardware circuit.

Here, when a cache miss occurs, in the case where a cache entry that has the oldest-order flag attached is present, the selection unit may select the cache entry to be replaced, and in the case where a cache entry that has the oldest-order flag attached is not present, the selection unit may select a cache entry to be replaced in accordance with the order data.

Here, the cache entry may have, as the order data, a 1-bit order flag that indicates whether the access order is old or new, and the selection unit may select, to be replaced, the cache entry in which the order flag indicates old, in the case where a cache entry that has the oldest-order flag attached is not present.

According to such a configuration, the access order data may be a 1-bit flag; because the data amount of the access order data is small and updating is easy, it is possible to reduce hardware dimensions.

Here, the modification unit may modify the order data so that one cache entry shows Nth in the access order, and N may be any one of: (a) a number indicating the oldest in the access order; (b) a number indicating the newest in the access order; (c) a number indicating Nth from the oldest in the access order; and (d) a number indicating Nth from the newest in the access order.

Here, the modification unit may have an instruction detection unit which detects that a memory access instruction that includes a modification directive for the access order has been executed, and a rewrite unit which rewrites the order data for a cache entry that is accessed due to the instruction.

Here, the modification unit may include: a holding unit which holds an address range specified by a processor; a searching unit which searches for a cache entry that holds data corresponding to the address range held in the holding unit; and a rewrite unit which rewrites the order data so that the access order of the cache entry searched for by the searching unit is Nth in order.

Note that a control method of the cache memory according to the present invention has the same units and uses as mentioned above.

Effects of the Invention

With a cache memory according to the present invention, it is possible to replace infrequently accessed data preferentially over frequently accessed data, as well as preventing frequently-accessed data from being replaced.

For example, by causing a cache entry that will no longer be read out or written to by a processor to be oldest in an access order, the cache entry is selected first as a target for replacement. Through this, it is possible to reduce the occurrence of a cache miss caused by infrequently-accessed data remaining in the cache memory.

In addition, there is no need for the processor to manage a line size and addresses of line borders of the cache memory, and it is therefore possible to eliminate a load for cache memory management in the processor.

NUMERICAL REFERENCES

Figure 1:
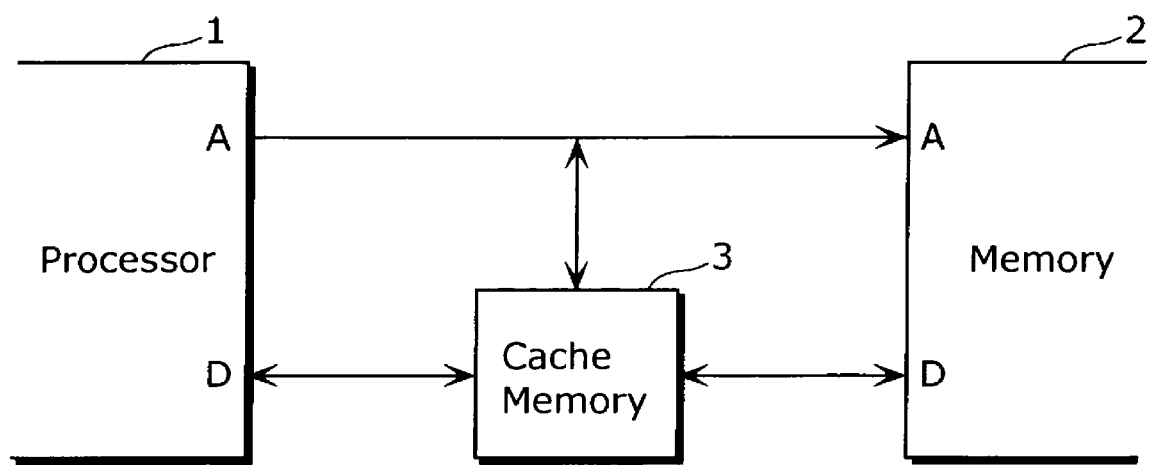
FIG. 1 is a block diagram showing a rough structure of a system that includes a processor, a cache memory, and a memory according to the first embodiment of the present invention.

1 processor
2 memory
3 cache memory
20 address register
20 tag address register
21 memory I/F
30 decoder
31a to 31d way
32a to 32d comparator
33a to 33d AND circuit
34 OR circuit
35 selector
36 selector
37 demultiplexer
38 control unit
39 replace unit
40 W flag setting unit
41 flag update unit
131a to 131d way
138 control unit
139 replace unit
401 command register
402 start address register
403 size register
404 adder
405 start aligner
406 end aligner
407 flag rewrite unit
407a flag rewrite unit
408 comparator
410 LD/ST instruction detection unit
411 weak directive detection unit
412 AND circuit
413 rewrite unit

BEST MODE FOR CARRYING OUT THE INVENTION

First Embodiment

<Overall Structure>

FIG. 1 is a block diagram showing a rough structure of a system that includes a processor 1, a cache memory 3, and a memory 2 according to the first embodiment of the present invention. In this diagram, the cache memory 3 according to the present invention is included in the system that has the processor 1 and the memory 2.

The cache memory 3 assumes a replace control which replaces a cache entry older in access order, through a so-called LRU method. The cache memory 3 of the present embodiment is configured so as to evict, as a target for replacement, a cache entry that holds infrequently-accessed data, by modifying, against an access order, order data that indicates the access order for determining the target for replacement. Specifically, by adding to the cache entry a weak flag W which indicates that the cache entry is last in the access order, the order data is indirectly modified. Through this, a complicated circuit which directly modifies the order data is unnecessary.

<Configuration of the Cache Memory>

Hereafter, as a concrete example of the cache memory 3, a configuration in the case where a four-way set associative cache memory is applied in the present invention is described.

Figure 2:
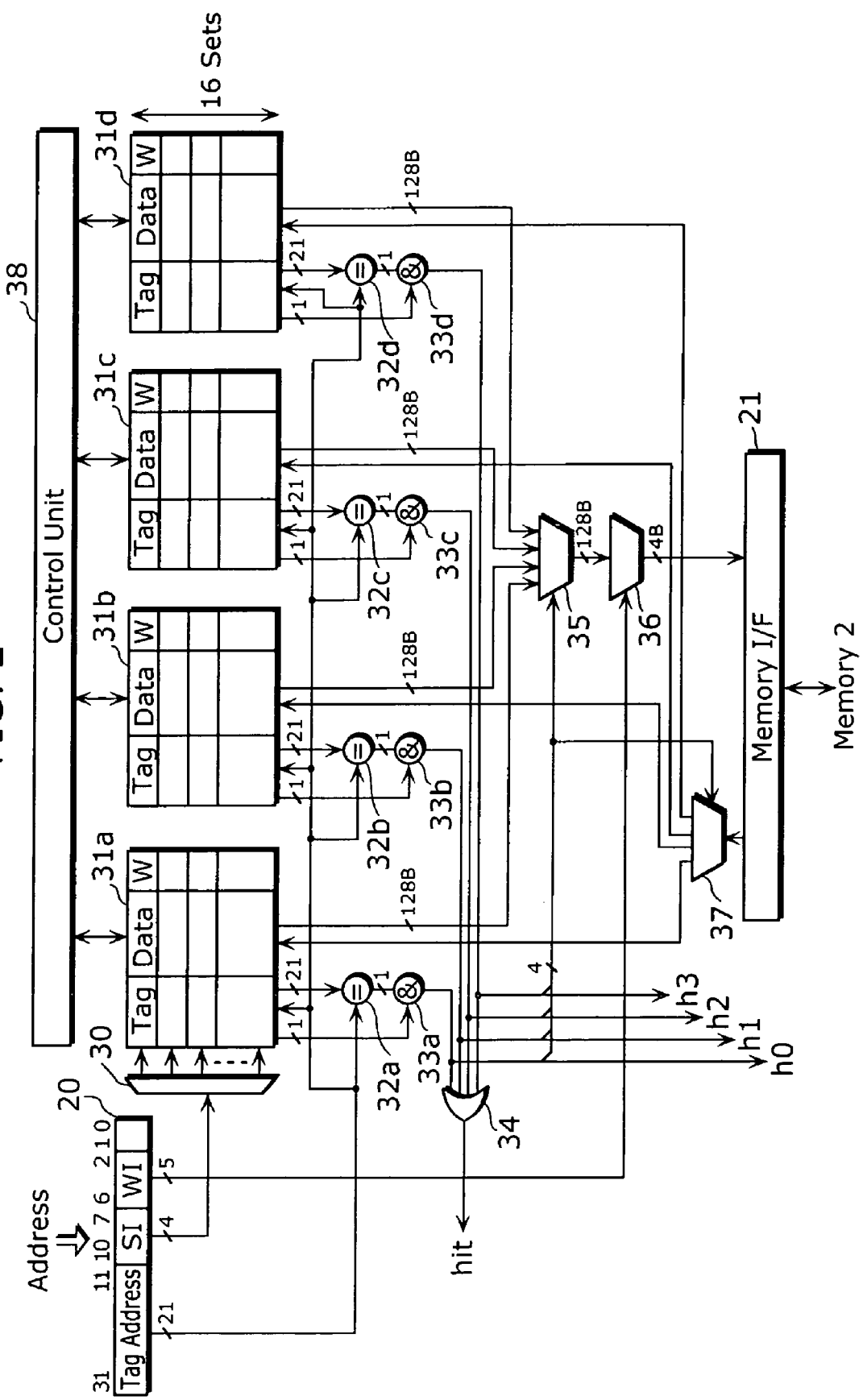
FIG. 2 is a block diagram showing an example of a configuration of a cache memory.

FIG. 2 is a block diagram showing an example of a configuration of the cache memory 3. As in this diagram, the cache memory 3 includes: an address register 20; a memory I/F 21; a decoder 30; four ways 31a to 31d (hereafter shortened to way 0 to way 3); four comparators 32a to 32d; four AND circuits 33a to 33d; an OR circuit 34; selectors 35 and 36; a demultiplexer 37; and a control unit 38.

The address register 20 is a register that holds an access address to the memory 2. This access address is 32-bit. As shown in this diagram, the access address has, in order from the most significant bit down, a 21-bit tag address, a 4-bit set index (SI in the diagram), and a 5-bit word index (WI in the diagram). Here, the tag address indicates a domain in the memory mapped in a way (a size being a number of sets×a block). The size of this domain is a size determined by an address bit below the tag address (A10 to A0), or in other words, is 2 kilobytes, and is also the size of one way. The set index (SI) indicates one of a plurality of sets spanning the ways 0 to 3. The set index is 4 bits, so the number of sets is 16 sets. The cache entry specified by the tag address and set index is a replace unit, and when stored in the cache memory, is called line data or a line. A size of the line data is a size determined by an address bits below the set index, or in other words, is 128 bytes. When 1 word is 4 bytes, 1 line data is 32 words. The word index (WI) indicates 1 word among a plurality of words that make up the line data. The lowest 2 bits (A1, A0) in the address register 20 are ignored during word access.

The memory I/F 21 is an I/F for the cache memory 3 to access the memory 2, such as in a data writeback from the cache memory 3 to the memory 2, a data load from the memory 2 to the cache memory 3, and the like.

The decoder 30 decodes the 4 bits of the set index, and selects one of the 16 sets spanning the four ways 0 to 3.

The four ways 0 to 3 are four ways that have the same configuration, and have a capacity of 4×2 kilobytes. Each way has 16 cache entries.

Figure 3:
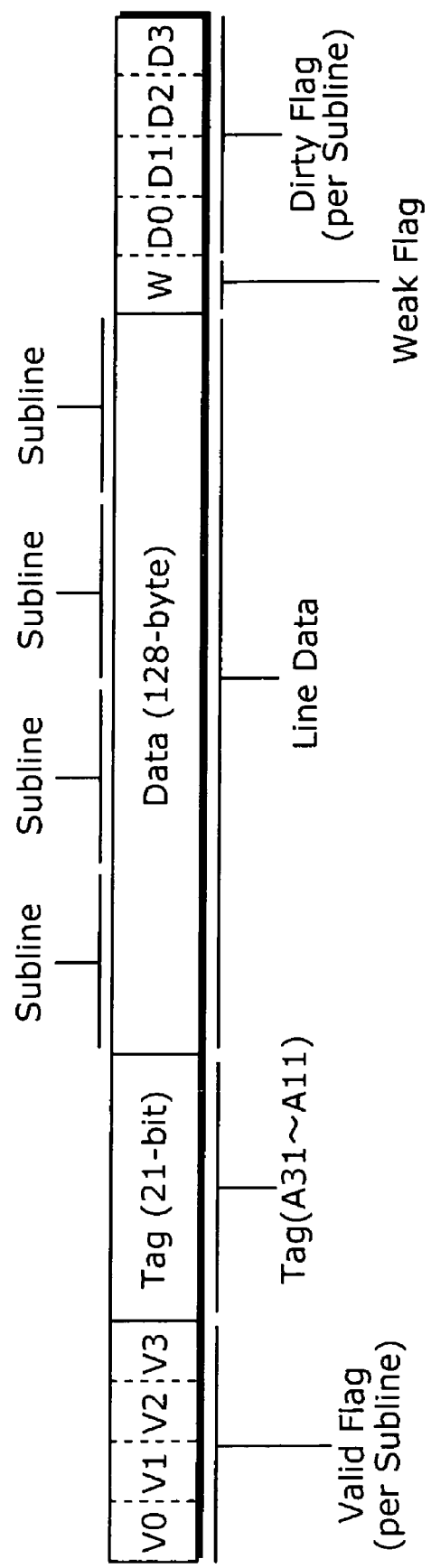
FIG. 3 shows in detail a bit configuration of a cache entry.

FIG. 3 shows in detail a bit configuration in one cache entry. In the same diagram, one cache entry has valid flags V0 to V3, a 21-bit tag, 128-byte line data, a weak flag W, and dirty flags D0 to D3.

The tag is a copy of the 21-bit tag address.

The line data is a copy of the 128-byte data in a block specified by the tag address and the set index, and is made up of four sublines of 32 bytes.

The valid flags V0 to V3 correspond to the four sublines, and indicate whether or not the subline is valid.

The weak flag W is a flag for specifying that the access order of the cache entry is regarded as the oldest. That is, W=1 means that the processor 1 reads out and writes to the cache entry no further, or that an access frequency is low. Also, W=1 means that the access order regarding a replace control is treated as the oldest, or in other words, that it is a weakest (weak) cache entry. W=0 indicates that such is not the case.

The dirty flags D0 to D3 correspond to the four sublines, and indicate whether or not the processor has written to those sublines; or in other words, whether or not it is necessary to write back the data to the memory, the data being cached data in the sublines which differs from the data within the memory due to a write.

The comparator 32a compares whether or not the tag address in the address register 20 matches with the tag of the way 0 among the tags included in the set selected by the set index. The comparators 32b to 32c are the same except in that they correspond to the ways 31b to 31d.

The AND circuit 33a compares whether not the valid flag matches with the comparison results of the comparator 32a. This comparison result is referred to as h0. In the case where the comparison result h0 is 1, this means that line data corresponding to the tag address and the set index within the address register 20 is present, or in other words, that there has been a hit in the way 0. In the case where the comparison result h0 is 0, this means there is a mishit. The AND circuits 33b to 33d are the same except in that they correspond to the ways 31b to 31d. The comparison results h1 to h3 indicate whether there is a hit or a miss in the ways 1 to 3.

The OR circuit 34 calculates an OR of the comparison results h0 to h3. The result of this OR is a hit. The hit indicates whether or not there is a hit in the cache memory.

The selector 35 selects the line data of the way that is hit, from among the line data of the ways 0 to 3 in the selected set.

The selector 36 selects 1 word that indicates the word index, from among the 32-word line data selected by the selector 35.

The demultiplexer 37 outputs data to be written to one of the ways 0 to 3 when data is written to the cache entry. This data to be written may be per word unit.

The control unit 38 controls the entire cache memory 3. In particular, the control unit 38 carries out setting of the W flag, and replace control in accordance with the W flag.

<Structure of the Control Unit>

Figure 4:
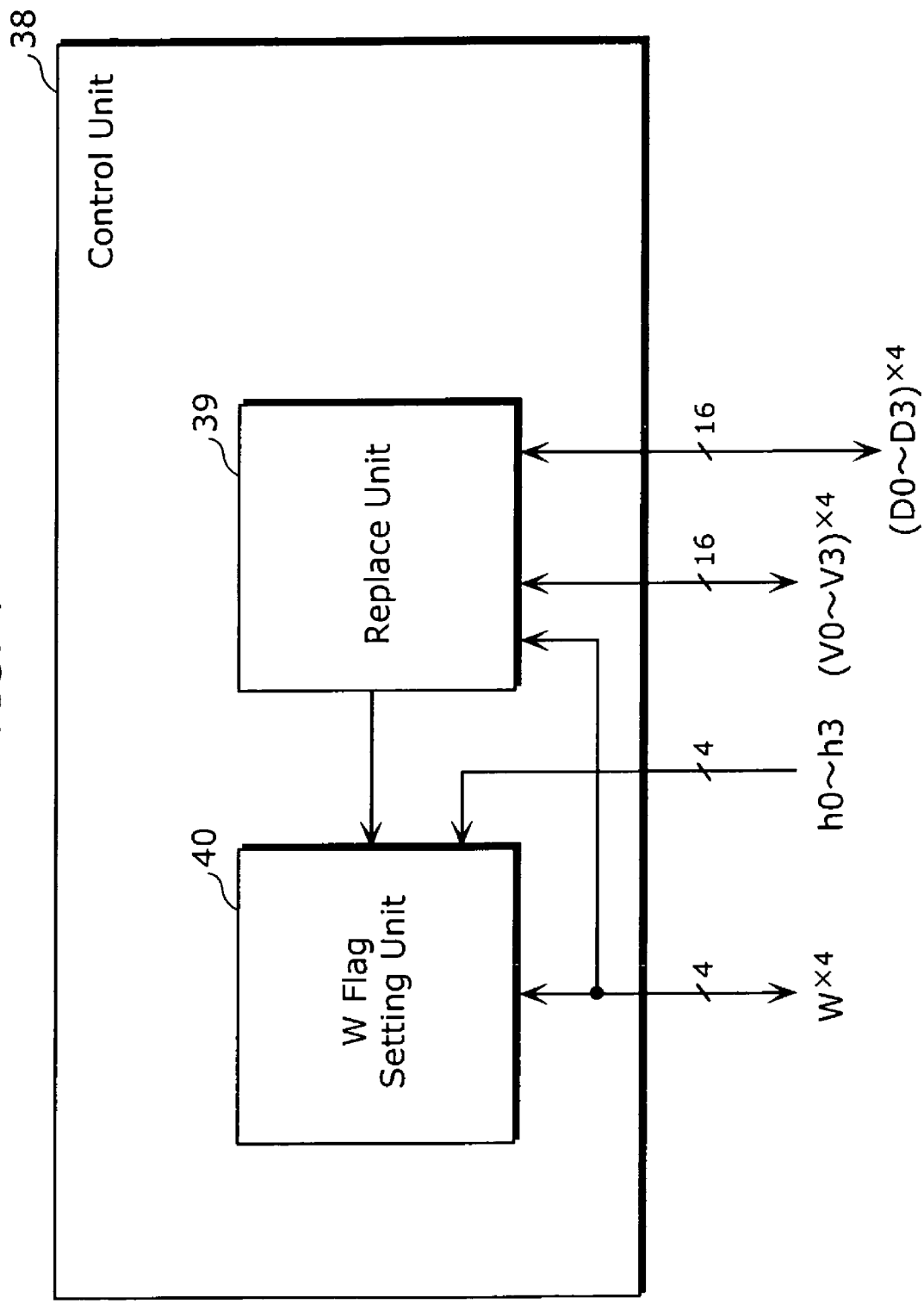
FIG. 4 is a block diagram showing a structure of a control unit.

FIG. 4 is a block diagram showing a structure of the control unit 38. In this diagram, the control unit 38 includes a replace unit 39 and a W flag setting unit 40.

When a cache entry in which W=1 is set is present at the time of a replace due to a cache miss, the replace unit 39 views this cache entry as the oldest in access order and selects it as a target for replacement, and carries out replacement.

The W flag setting unit 40 sets the weak flag W in accordance with a command from the processor 1. The processor 1 issues, to the cache memory 3, a command which instructs setting of the weak flag W for a cache entry that will no longer be written to or read from.

<Structure of the W Flag Setting Unit>

Figure 5:
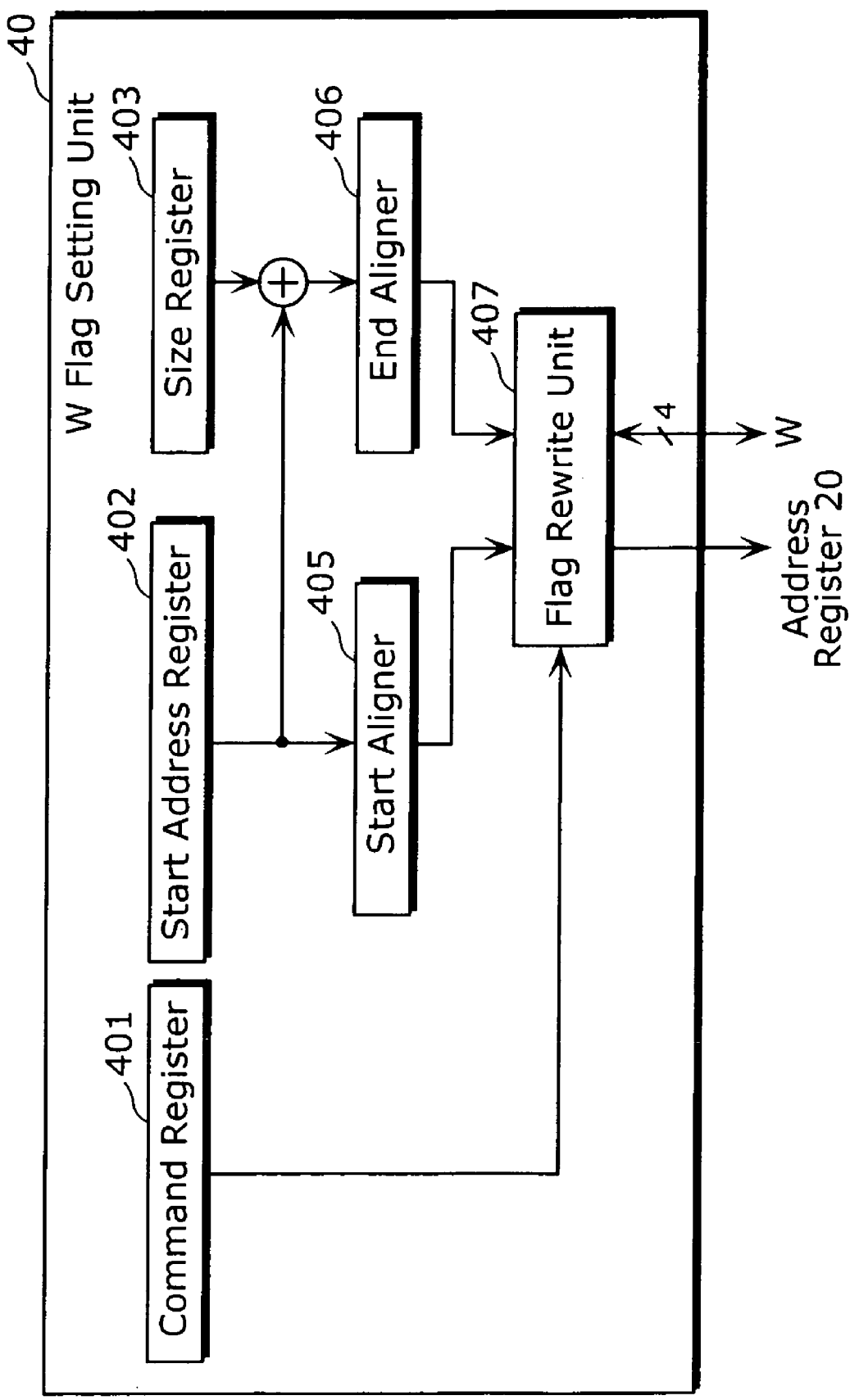
FIG. 5 is a block diagram showing an example of a structure of a W flag setting unit.

FIG. 5 is a block diagram showing an example of a structure of the W flag setting unit 40. As shown in this diagram, the W flag setting unit 40 includes: a command register 401; a start address register 402; a size register 403; an adder 404; a start aligner 405; an end aligner 406; and a flag rewrite unit 407.

Figure 6A:
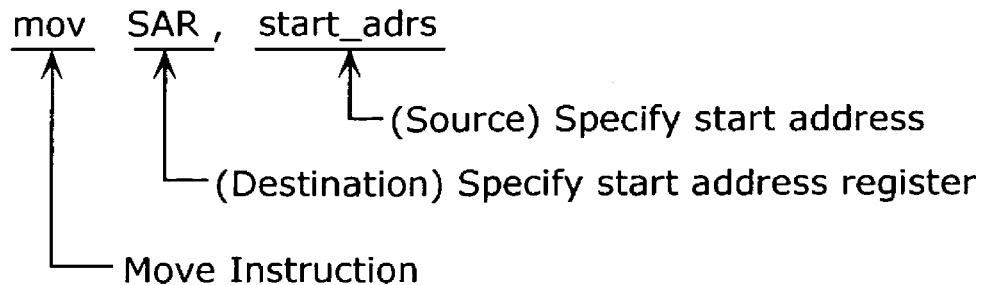
FIG. 6A shows an example of an instruction to write a start address in a start address register.
Figure 6B:
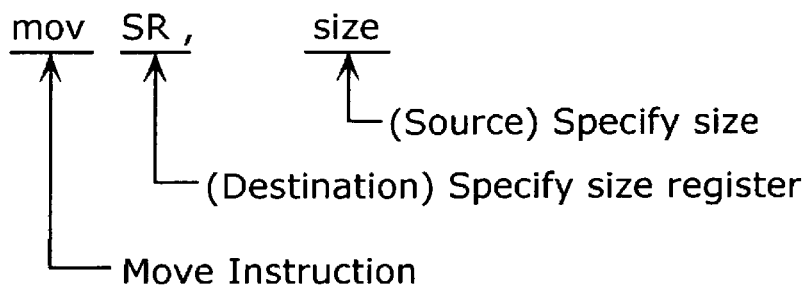
FIG. 6B shows an example of an instruction to write a size in a size register.
Figure 6C:
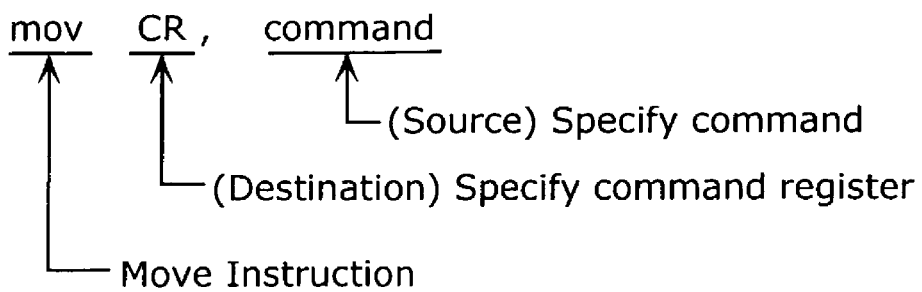
FIG. 6C shows an example of an instruction to write a command in a command register.
Figure 6D:
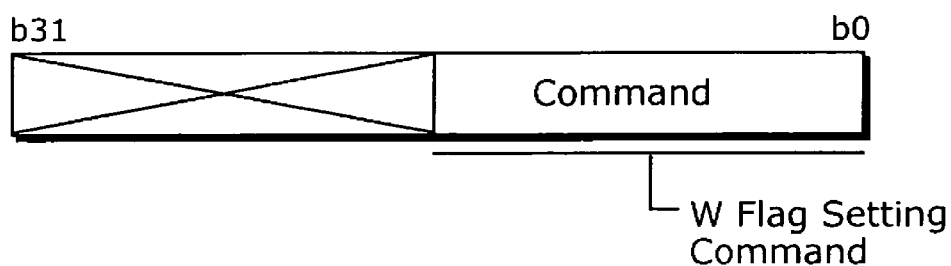
FIG. 6D shows an example of a command.

The command register 401 is a register that is directly accessible by the processor 1, and holds a W flag setting command written by the processor 1. FIG. 6C shows an example of an instruction to write the command to the command register 401. This instruction is a normal move instruction (mov instruction), and assigns a command to a source operand and a command register (CR) to a destination operand. FIG. 6D shows an example of the command. This command is a specific code that indicates the W flag setting command. The W flag setting command is a command that instructs the W flag to be set for a cache entry that holds data corresponding to an address range from a start address held in the start address register 402 to a size held in the size register 403.

The start address register 402 is a register that is directly accessible by the processor 1, and holds a start address written by the processor 1. This start address indicates a start position of the address range at which the W flag should be set. FIG. 6A shows an example of an instruction to write the start address to the start address register 402. This instruction is, as in FIG. 6C, a normal move instruction (mov instruction).

The size register 403 is a register that is directly accessible by the processor 1, and holds a size written by the processor 1. This size indicates the address range from the start address. FIG. 6B shows an example of an instruction to write the size to the size register 403. This instruction is, as in FIG. 6C, a normal move instruction (mov instruction). Note that a unit of the size may be a number of bytes, a number of lines (number of cache entries), and so on; any predetermined unit is acceptable.

The adder 404 adds the start address held in the start address register 402 with the size held in the size register 403. An add result is an end address that indicates an end position of the address range. The adder 404 may add the size as a byte address in the case where the size is set as the number of bytes, and may add the size as a line address in the case where the size is set as the number of lines.

The start aligner 405 aligns the start address to a line border position. Through this alignment, the processor 1 can specify an arbitrary address as the start address regardless of the line size and the line border.

The end aligner 406 aligns the end address to a line border position. Through this alignment, the processor 1 can specify an arbitrary size as the abovementioned size regardless of the line size and the line border.

Figure 7:
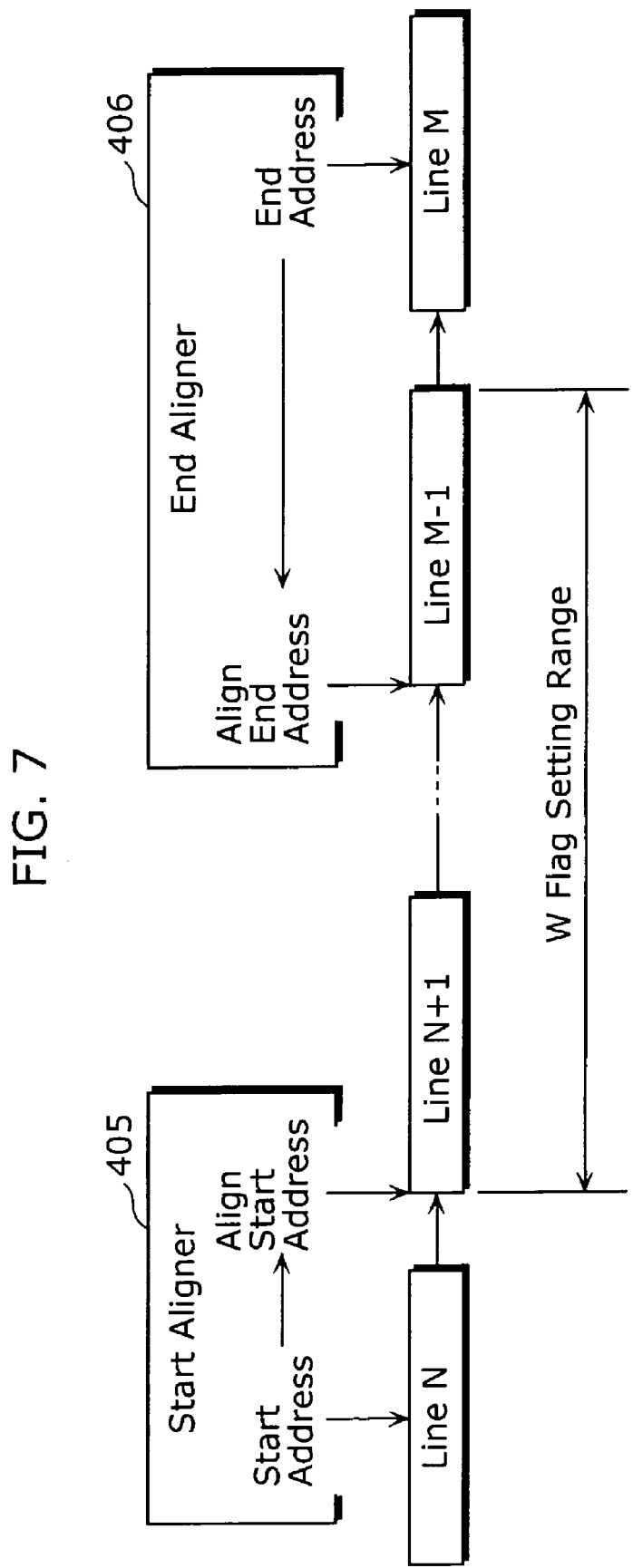
FIG. 7 shows a descriptive diagram of a start aligner and an end aligner.

FIG. 7 shows a descriptive diagram for the start aligner 405 and the end aligner 406. In this diagram, the start address specified by the processor 1 indicates an arbitrary position along the line N. The start aligner 405 aligns the start address to the top of the next line (N+1), and outputs the aligned address as an aligned start address. A line indicated by the aligned start address is called a start line.

In addition, the end address indicates an arbitrary position along the line M. The end aligner 406 aligns the end address to the top of the previous line (M−1), and outputs the aligned address as an aligned end address. A line indicated by the aligned end address is called an end line.

In this case, the W flag is set in each line (cache entry) from the start line (line (N+1)) to the end line (line (M−1)). In this manner, the start aligner 405 and the end aligner 406 align to inner sides of the address range which spans from the start address to the end address specified by the processor 1, because there is a possibility that the processor 1 will write to or read out from parts on the outer sides of the lines N and M.

The flag rewrite unit 407 sets the W flag at 1 when there is an entry in the cache memory 3 from the line indicated by the align start address to the line indicated by the align end address (in the example in FIG. 7, from the line (N+1) to the line (M−1)).

<W Flag Setting Processing>

Figure 8:
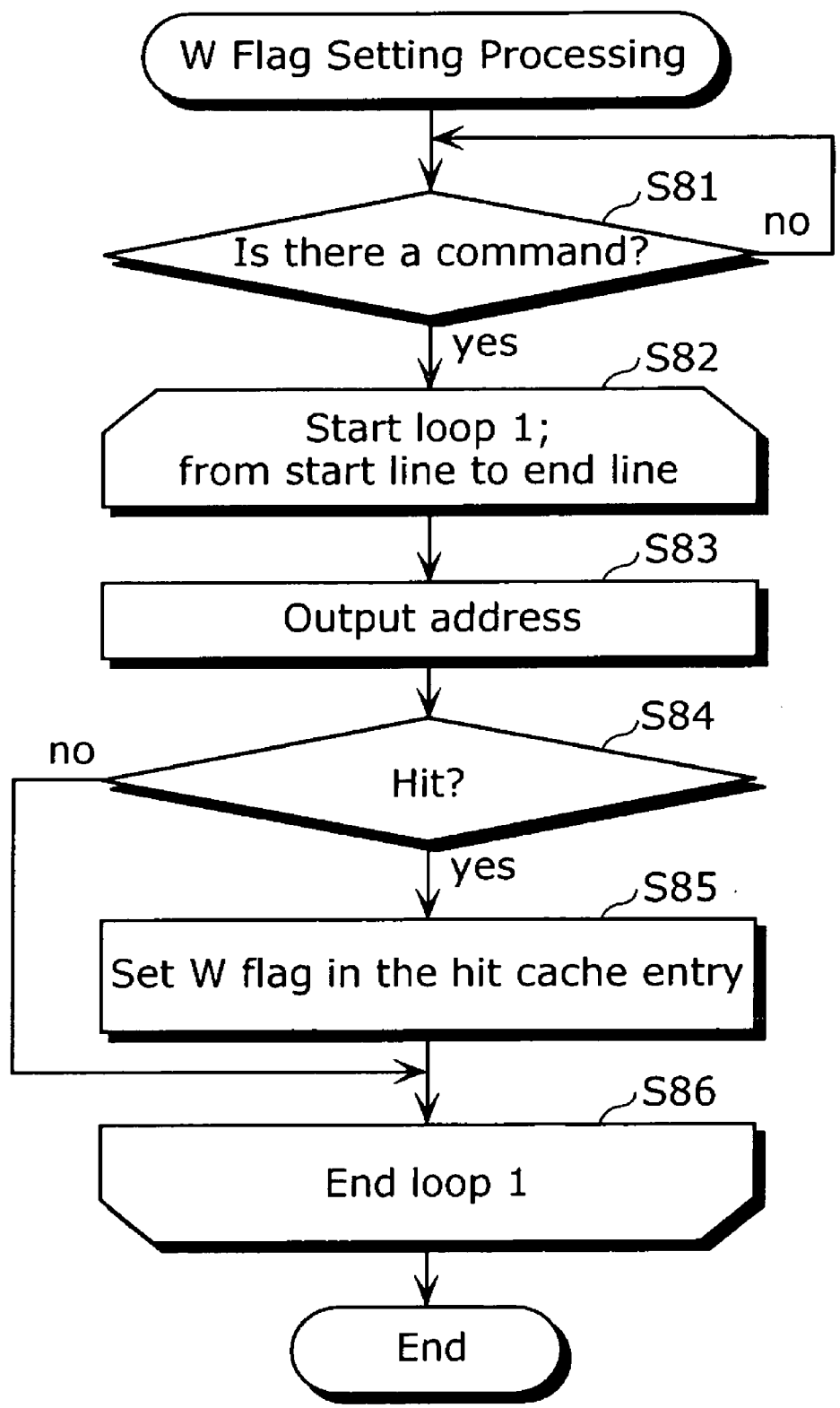
FIG. 8 is a flowchart that shows a W flag setting processing occurring in a flag rewrite unit.

FIG. 8 is a flowchart that shows a W flag setting processing occurring in a flag rewrite unit 407.

In the case where the W flag setting command is held in the command register 401, the flag rewrite unit 407 carries out processing of loop 1 (S82 to S86) while outputting each line address, from the start line to the end line, in order. The flag rewrite unit 407 carries out the same processing on each line, and therefore description is given for one line amount of processing.

In other words, during the time when the cache memory 3 is not being accessed by the processor 1, the flag rewrite unit 407 outputs the line address to the address register 20 (S83), causes the comparators 32a to 32d to compare the tag address of the address register 20 with the tag of the cache entry, and judges whether or not there is a hit (S84). In the case of a hit, the flag rewrite unit 407 sets the W flag at 1 for the hit cache entry (S85), but does nothing in the case of a mishit, as there is no entry in the cache memory.

Through this, the W flag is set at 1 in each line from the start line to the end line, in the case where there is an entry in the cache memory 3.

<Replace Processing>

Figure 9:
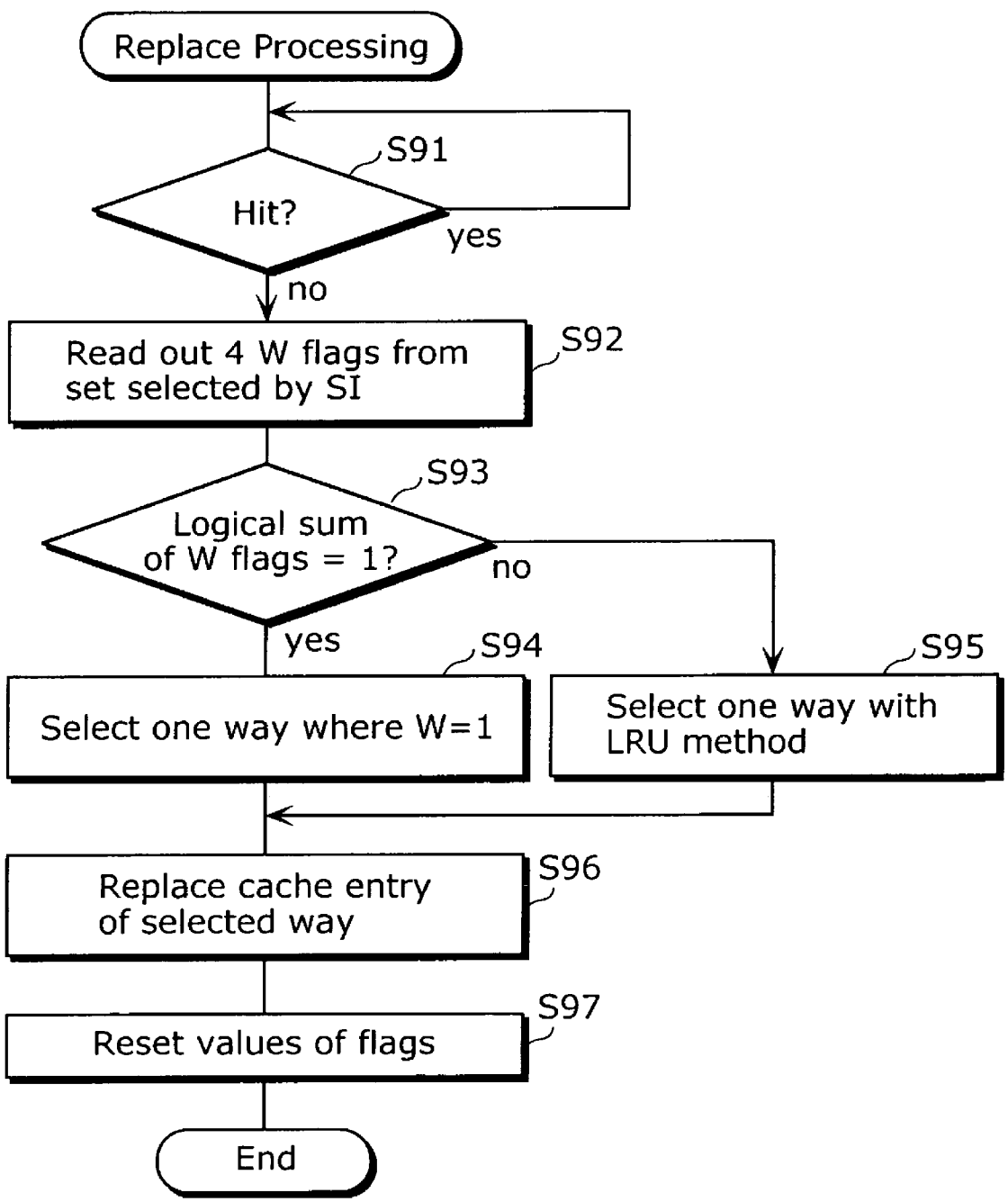
FIG. 9 is a flowchart that shows a replace processing occurring in a replace unit.

FIG. 9 is a flowchart that shows a replace processing occurring in the replace unit 39. In this diagram, when the memory access misses (Step S91), the replace unit 39 reads out the weak flags W of the four ways in the set selected by the set index (Step S92), and judges whether or not a logical OR of the four weak flags is 1, or in other words, whether a way where W=1 is present (Step S93). In the case where a way where W=1 is judged to be present, one way where W=1 is selected, the way being considered oldest in the access order of the cache entries (Step S94), and in the case where a way where W=1 is judged to be absent, one way is selected through a normal LRU method (Step S95). At this time, in the case where plural ways with weak flags W of 1 are present, the replace unit 39 selects one at random.

Furthermore, the replace unit 39 replaces cache entries of the selected way in the set (Step S96), and initializes the weak flag W of the cache entry to 0 after replacement (Step S97). Note that at this time the valid flags V and the dirty flags D are initialized to 1 and 0 respectively.

In the case where a way where W=1 is not present, the target for replacement is selected through the normal LRU method. In addition, in the case where a way of W=1 is present, the cache entry with the way of W=1 is selected as the target for replacement as a result of the way of W=1 being considered oldest in the access order. Through this, it is possible to reduce cache misses arising because the W=1 data with a low access frequency is present in the cache memory.

As has been described thus far, with the cache memory in the present embodiment, the line where the weak flag W=1 is the line which is no longer written to or read from by the processor, and as a result of treating the line as oldest in the access order, the line is selected as the next target for replacement. Therefore, it is possible to reduce cache misses arising due to data with a low access frequency.

In addition, the access order is modified by indirectly attaching the W flag, without directly modifying order data indicating the access order as in the conventional LRU method; therefore, implementation is possible without adding a complicated hardware circuit.

<Variations>

Note that the cache memory according to the present invention is not limited to the configuration shown in the above embodiment; various variations are possible. Hereafter, several variations are described.

(1) Instead of a Pseudo-LRU that employs a use flag U, the configuration may be one in which order data indicating the access order of the 4 ways is held and updated per cache entry, and the target for replacement is selected with the conventional LRU method. In this case as well, a cache entry of W=1 may be selected as the next target for replacement regardless of the access order. Furthermore, in the above embodiment, the order data is indirectly modified through the addition of the W flag, but the configuration may be one in which the order data is directly modified.

(2) In the above embodiment, the weak flag W indicates the oldest in the access order, but the weak flag W may also indicate the newest or not the oldest in the access order. In this case, the configuration may be one in which the replace unit 39 treats the cache entry with W=1 as not being the oldest, does not select the cache entry as a target for replacement, and selects a different cache entry. By adding the weak flag W which indicates not the oldest in access order to a cache entry that holds data with a high or medium access frequency, it is possible to prevent wasteful replacement.

(3) The following configuration is also possible: the processor 1 executes a special store instruction which instructs the setting of the weak flag W=1 and a writing of data; and the control unit 38 further includes an instruction detection unit which detects the special store instruction, and a flag setting unit which sets W=1 at the time of a write due to the store instruction.

(4) In the above embodiment, the four-way set-associative cache memory is described as an example, but the cache memory may be of any number of ways. In addition, in the above embodiment, the example described has a set number of 16, but there may be any number of sets.

(5) In the above embodiment, a set-associative cache memory is described as an example, but the cache memory may be a full-associative cache memory.

(6) In the above embodiment, the subline size is ¼ of the line size, but the subline size may be other sizes, such as ½, ⅛, and ¹⁄₁₆. In such a case, each cache entry may hold the same number of valid flags and dirty flags as sublines.

Second Embodiment

In the first embodiment, a configuration, which assumes a normal LRU method in which a cache entry is made oldest in an access order through a weak flag W, is described. In the present embodiment, a Pseudo-LRU method, which differs from the normal LRU method in that it expresses order data indicating the access order with a 1-bit flag, and a cache memory that causes a cache entry to become oldest, are described.

<Structure of the Cache Memory>

Figure 10:
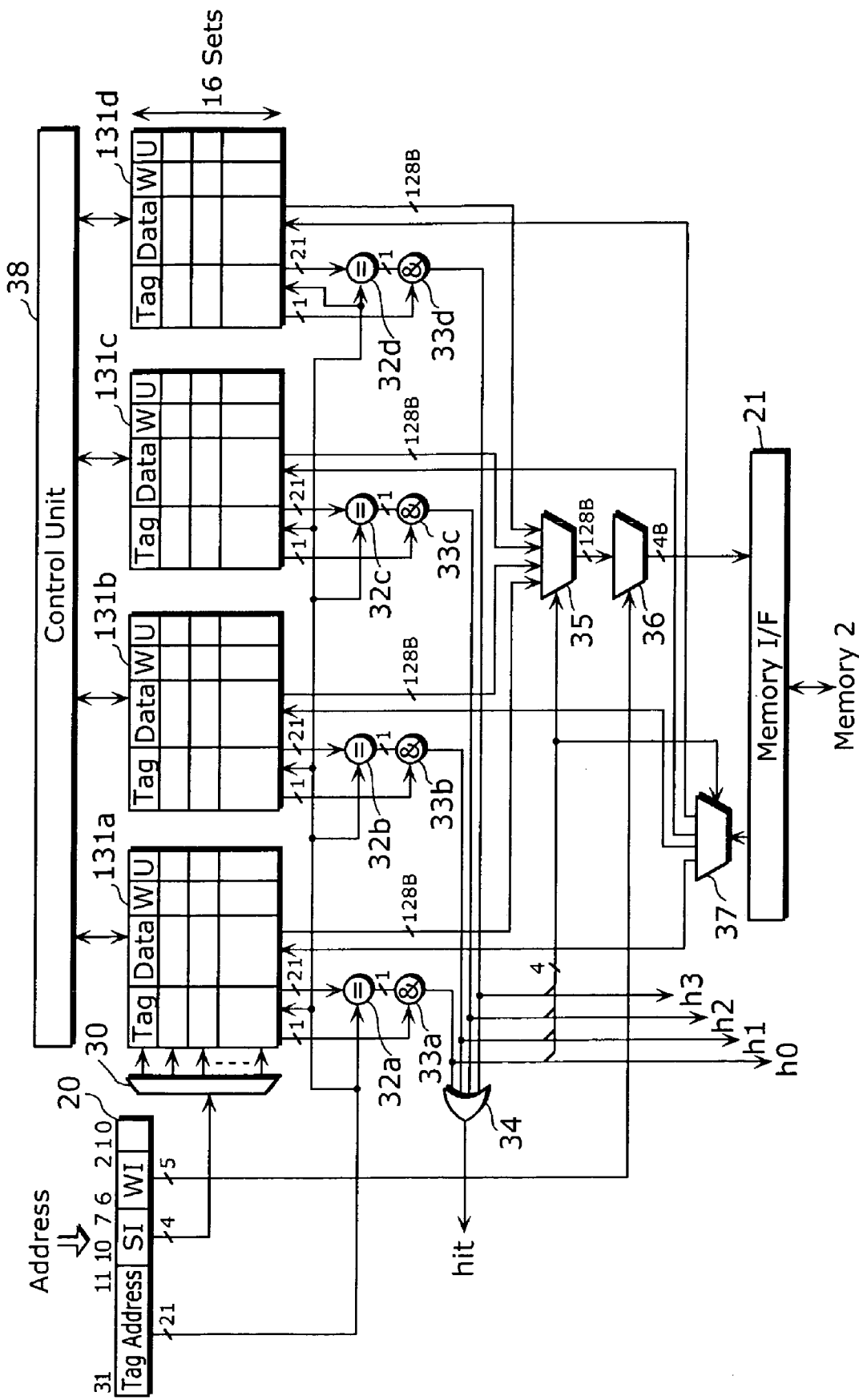
FIG. 10 is a block diagram showing a structure of a cache memory according to the second embodiment of the present invention.

FIG. 10 is a block diagram showing a configuration of a cache memory according to the second embodiment of the present invention. The cache memory in this diagram differs from FIG. 2 in that the cache memory includes ways 131a to 131d in place of ways 31a to 31d, and includes a control unit 138 in place of a control unit 38. Hereafter, description is given centered on the differing points; identical points are omitted.

The way 131a differs from the way 31a in that a use flag U is added in each cache entry. The same applies to the ways 131b to 131d. The use flag U is set instead of order data that indicates an access order among the four ways, and is a flag that expresses the access order in 1 bit.

Figure 11:
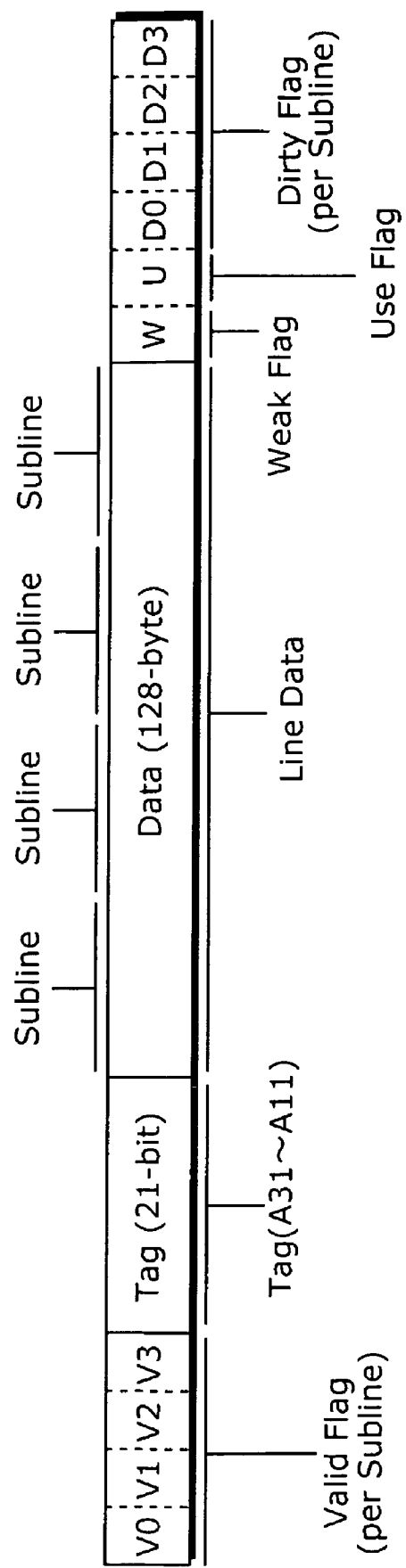
FIG. 11 shows a bit configuration of a cache entry.

FIG. 11 shows a bit configuration of the cache entry. The bit configuration in this diagram differs from FIG. 3 in that the use flag U has been added.

The use flag U indicates whether or not that cache entry has been accessed, and is used at the time of a replace through a mishit in the LRU method, in place of the access order data in the cache entries of the four ways. More accurately, a use flag U of 1 means there has been an access, and 0 means there has been no access. However, when all use flags of the four ways in one set become 1, the use flags reset to 0. To put it differently, the use flag U indicates two relative states: whether the time of access is old, or new. That is, a cache entry with a use flag of 1 has been accessed more recently than a cache entry with a use flag of 0.

The control unit 138 differs from the control unit 38 in that it carries out replace control using the use flag U instead of access order information in the LRU method.

<Structure of the Control Unit>

Figure 12:
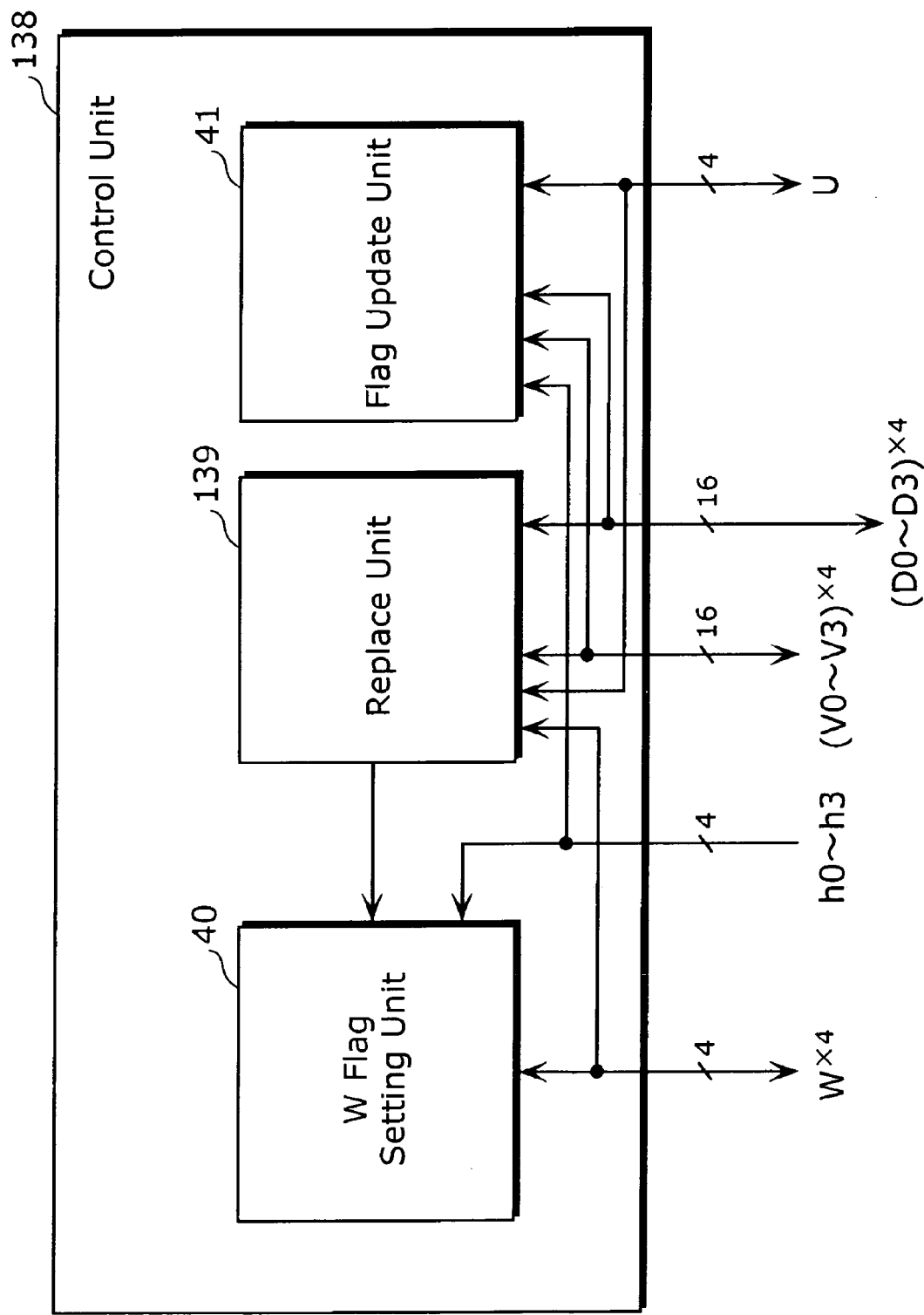
FIG. 12 is a block diagram showing a structure of a control unit.

FIG. 12 is a block diagram showing a structure of the control unit 138. The control unit 138 in this diagram differs from the control unit 38 in that there is a replace unit 139 instead of the replace unit 39, and a flag update unit 41 has been added.

The replace unit 139 carries out replace processing at the time of a cache miss, through the Pseudo-LRU method which uses the use flag U for the access order. At that time, when there is a cache entry in which the weak flag W is 1, the replace unit 139 treats this cache entry is the oldest cache entry, and selects it as the next target for replacement.

The flag update unit 41 carries out update processing for the use flag U when the cache memory is accessed.

<Description of the Use Flag U>

Figure 13:
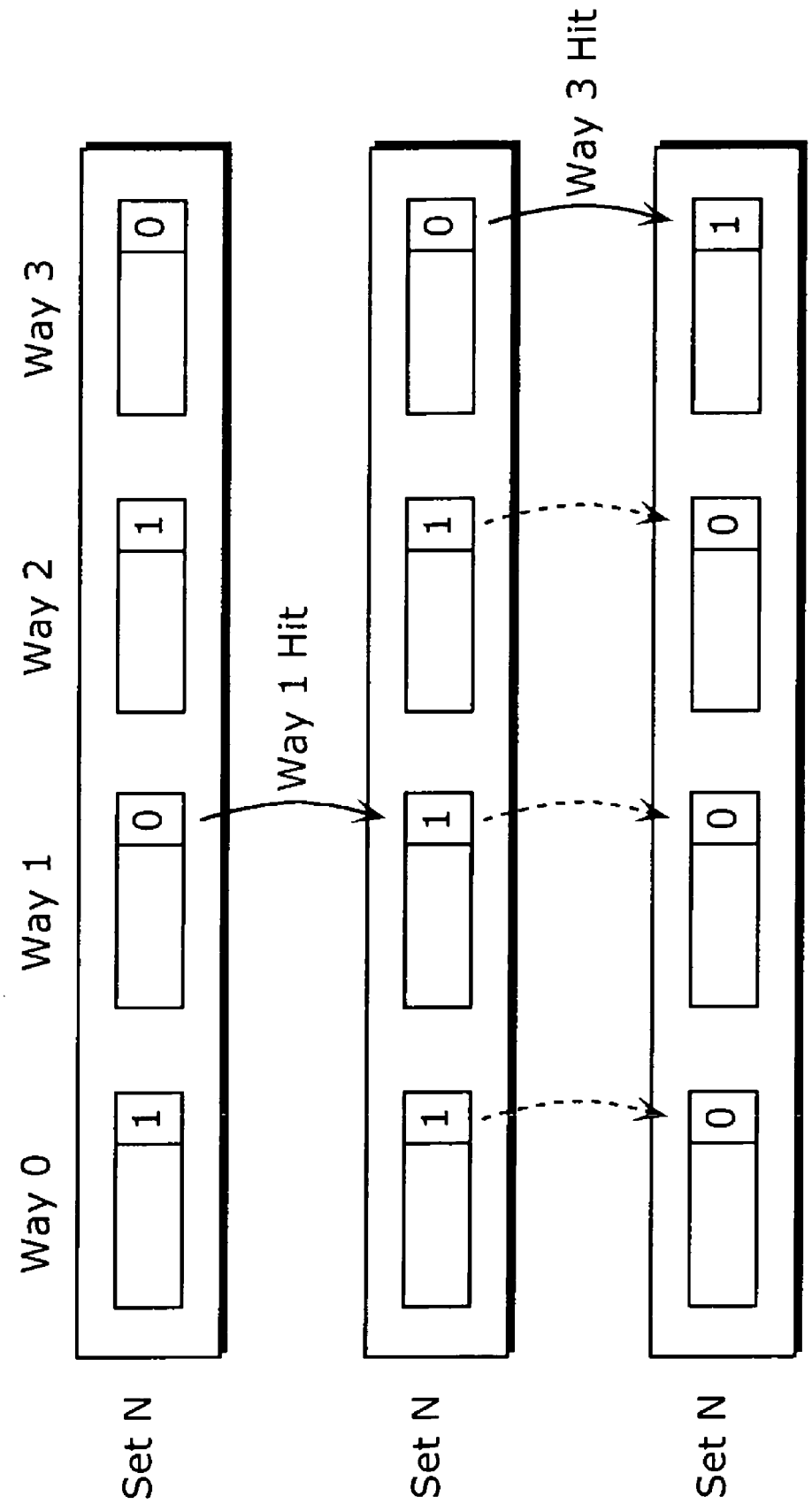
FIG. 13 shows an example of an update of a use flag by a replace unit.

FIG. 13 shows an example of an update of the use flag by the replace unit 139. Top, middle and bottom levels in this diagram indicate the cache entries of the four ways that make up the set N which spans the ways 0 to 3. A right end of the four cache entries is either 0 or 1, and indicates a value of each use flag. These four use flags U are written as U0 to U3.

In the top level in this diagram, (U0 to U3)=(1, 0, 1, 0), which means that the cache entries in ways 0 and 2 have been accessed, and the cache entries in ways 1 and 3 have not been accessed.

In this state, in the case where the memory access hits in the cache entry of the way 1 in the set N, (U0 to U3) are updated and become (1, 1, 1, 0), as indicated by the middle level of the diagram. In other words, the use flag U1 of the way 1 is updated from 0 to 1, as indicated by the solid line.

Furthermore, when in the state shown in the middle level of this diagram, in the case where the memory access hits the cache entry of the way 3 in the set N, (U0 to U3) are updated and become (0, 0, 0, 1), as indicated by the bottom level of the diagram. In other words, the use flag 1 of the way 3 is updated from 0 to 1, as indicated by the solid line. In addition to this, the use flags U0 to U2 not in the way 3 are updated from 1 to 0, as shown by the dotted lines. This shows that the cache entry of way 3 has been accessed more recently than each cache entry in the ways 0 to 2.

When no cache entry where W=1 is present at the time of a cache miss, the replace unit 139 determines a cache entry to be replaced based on the use flag and carries out replacement. For example, the replace unit 139 determines any of the ways 1 and 3 to be replaced in the top level of FIG. 5, determines the way 3 to be replaced in the middle level of FIG. 5, and determines any of ways 0 to 2 to be replaced in the bottom level of FIG. 5.

<Description of the Weak Flag W>

Figure 14A:
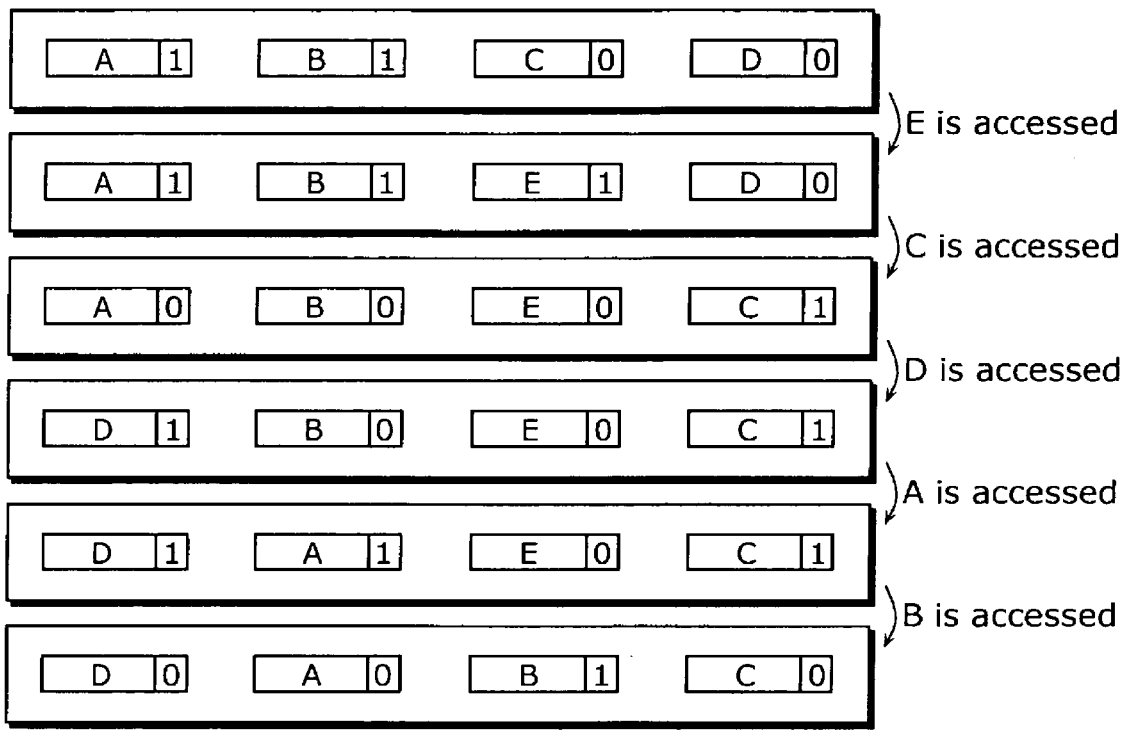
FIG. 14A is a diagram showing a cache entry being replaced in the case where a weak flag is not present.

FIG. 14A is a comparative example of the case where the weak flag is assumed as not being present, and shows the cache entry being replaced. In the same manner as FIG. 13, this diagram shows four cache entries that make up the set N which spans across the ways 0 to 3. The right end of the four cache entries is 1 or 0, and indicates the value of each use flag. In addition, only data E is infrequently-accessed data, and data A, B, C, and D is frequently-accessed data.

When the processor 1 accesses the data E in the state shown in the first level of this diagram, shown in FIG. 14A, a cache miss occurs. Due to this cache miss, for example, from among the cache entries where U=0, the cache entry of the frequently-accessed data C is replaced by the infrequently-accessed data E, and the state becomes that shown in the second level.

When the processor 1 accesses the data C in the state shown in the second level, a cache miss occurs. Due to this cache miss, the cache entry of the frequently-accessed data D, which is the cache entry where U=0, is replaced by the frequently-accessed data C, and the state becomes that shown in the third level.

When the processor 1 accesses the data D in the state shown in the third level, a cache miss occurs. Due to this cache miss, for example, the cache entry of the frequently-accessed data C is replaced with the frequently-accessed data D, and the state becomes that shown in the fourth level.

In the same manner, in the fourth level as well, the infrequently-used data E is not selected to be replaced, and remains in the cache memory.

In the state shown in the fifth level, the infrequently-used data is the oldest (U=0), and thus is selected to be replaced and is evicted.

In this manner, there are cases in four-way where, due to the infrequently-accessed data E, a worst-case scenario of four cache misses arises, in the Pseudo-LRU method (and in the normal LRU method).

Figure 14B:
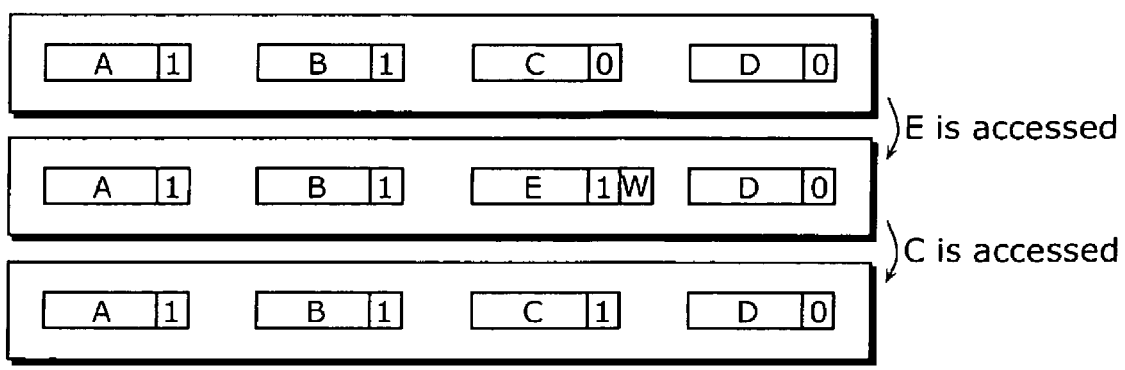
FIG. 14B is a descriptive diagram showing a role of a weak flag W in a replace processing.

FIG. 14B is a descriptive diagram showing a role of the weak flag W in the replace processing.

In this figure, when the processor 1 accesses the data E in the state shown in the first level (which is identical to the first level in FIG. 14A), a cache miss occurs. Due to this cache miss, for example, from among the cache entries where U=0, the cache entry of the frequently-accessed data C is replaced by the infrequently-accessed data E. At this time, the processor 1 sets the weak flag in the cache entry of the data E at 1. Through this, the cache entry of the data E is evicted next at the time of the next cache entry, and the state becomes that shown in the second level.

When the processor 1 accesses the data C in the state shown in the second level, a cache miss occurs. Due to this cache miss, the cache entry of the infrequently-accessed data E, which is the cache entry where W=1, is selected to be replaced, is replaced with the frequently-accessed data C, and the state becomes that shown in the third level.

In this manner, by setting the weak flag W, it is possible to reduce the occurrence of cache misses due to infrequently-accessed data.

<U Flag Update Processing>

Figure 15:
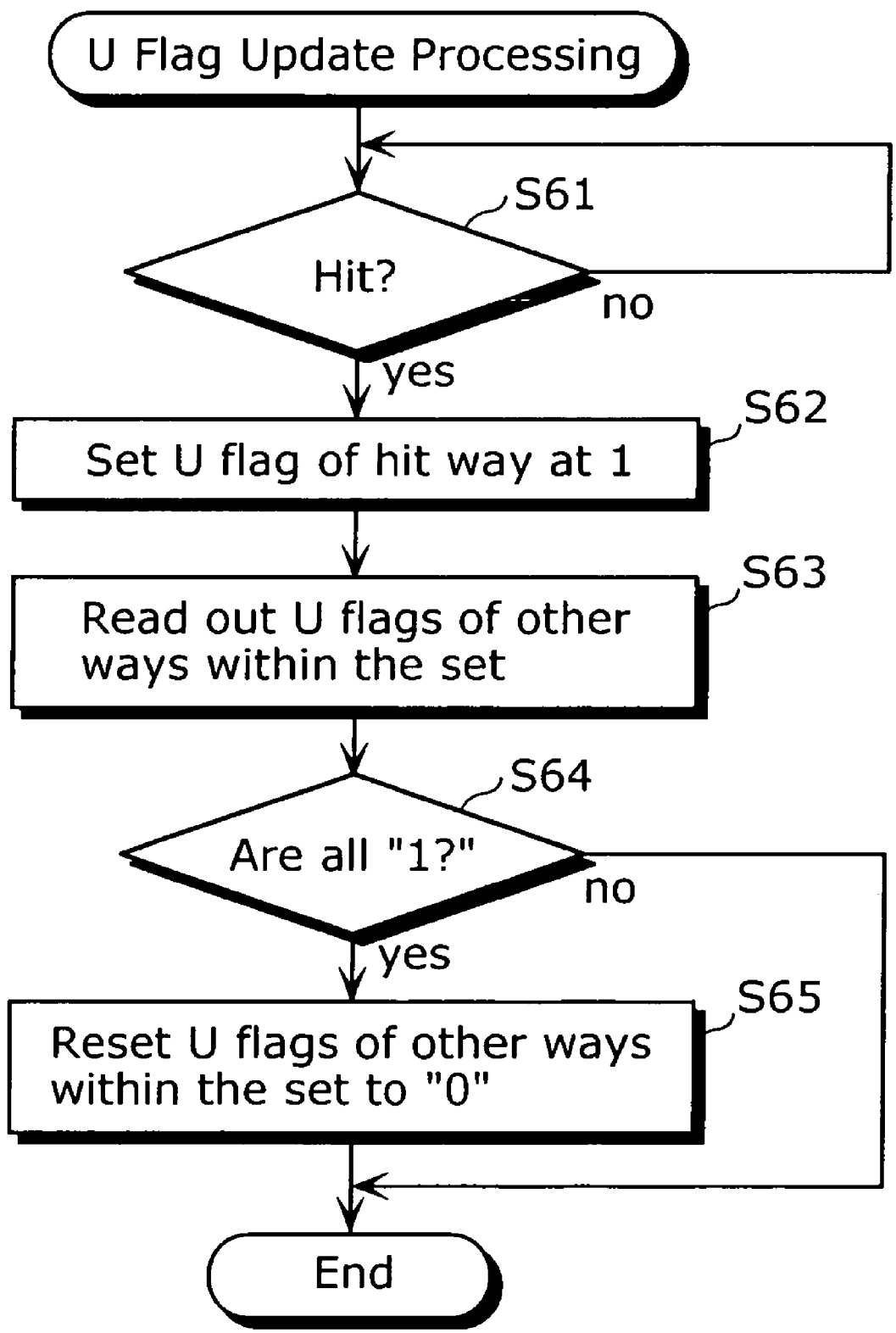
FIG. 15 is a flowchart showing a U flag update processing in a flag update unit.

FIG. 15 is a flowchart showing a U flag update processing by a flag update unit 41. In this diagram, the use flag U of a cache entry with a valid flag of 0 (invalid) is initialized to 0.

In this diagram, when there is a cache hit (Step S61), the flag update unit 41 sets the use flag U of the way in which the hit occurred within the set selected by the set index at 1 (Step S62); reads out the other use flags U of the other ways within that set (Step S63); judges whether or not all of the read-out use flags U are 1 (Step S64); when all are not 1, the process finishes, and when all are 1, the flag update unit 41 resets all the use flags U in the other ways to 0 (Step S65).

In this manner, the flag update unit 41 updates the use flag U, as shown in the update examples given in FIGS. 13, 14A, and 14B.

<Replace Processing>

Figure 16:
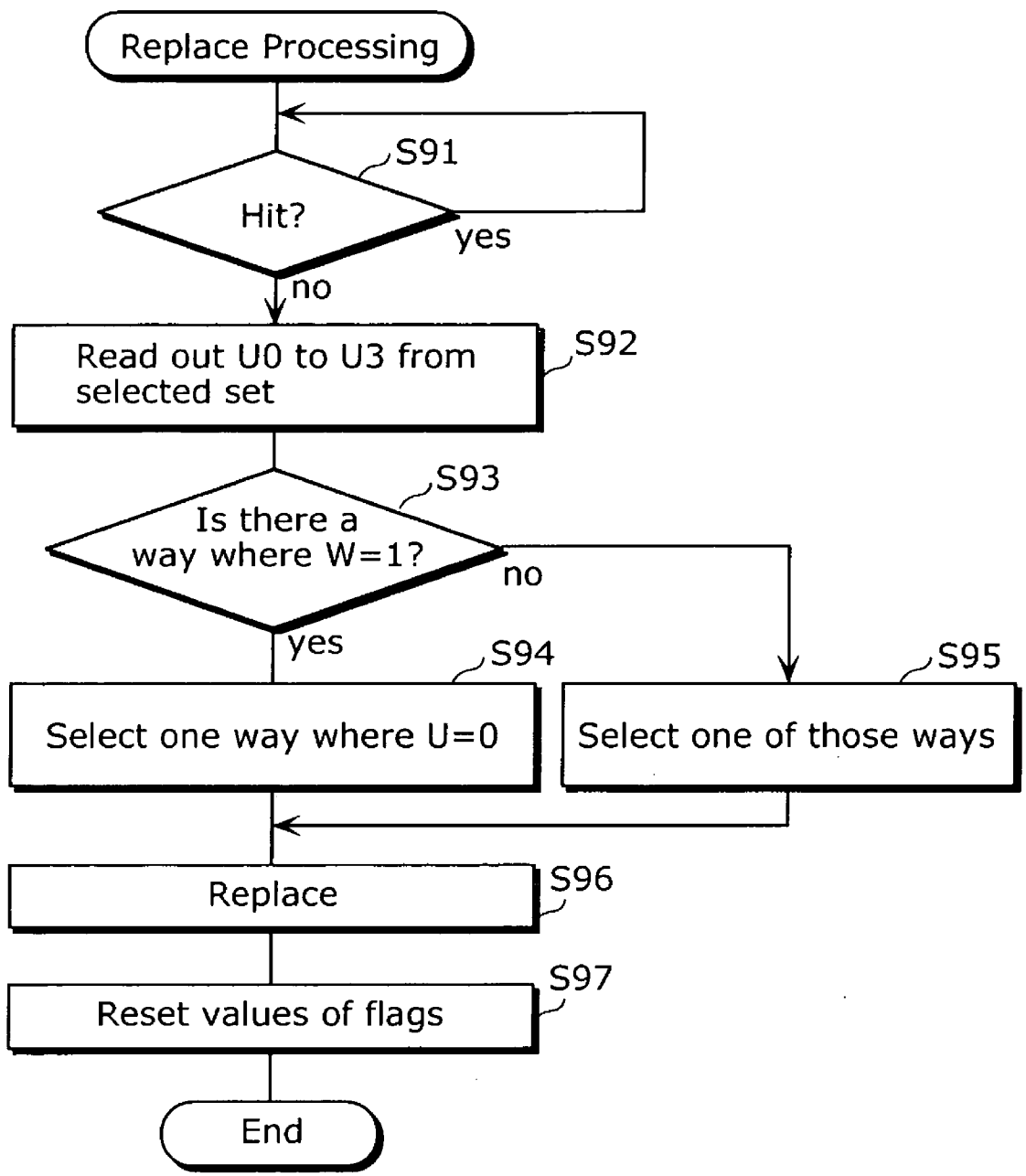
FIG. 16 is a flowchart showing a replace processing in a replace unit.

FIG. 16 is a flowchart showing a replace processing by the replace unit 139. In this diagram, when the memory access misses (Step S91), the replace unit 139 reads out the weak flags W and the use flags U of the four ways within the set selected by the set index (Step S92), and judges whether or not a way where W=1 is present (Step 593). The replace unit 139 selects one way where U=0 in the case of judging that a way where W=1 is not present (Step S94). At this time, in the case where a plurality of ways in which the use flag is 0 are present, the replace unit 139 selects one at random. In the case where it is judged that a way with W=1 is present, the replace unit 139 selects one way with W=1 regardless of the value of the U flag (Step S95). At this time, in the case where a plurality of ways in which the weak flag W is 1 are present, the replace unit 139 selects one at random.

Furthermore, the replace unit 139 replaces the cache entry of the selected way in the set (Step S96), and after replacement, initializes the use flag U of the cache entry to 1 and the weak flag W of the cache entry to 0 (Step S97). Note that at this time, the valid flag V and the dirty flag D are initialized to 1 and 0 respectively.

In this manner, in the case where the way with W=1 is not present, one target for replacement is selected from among the cache entries with a use flag U of 0.

In the case where the way where W=1 is present, one cache entry of the way where W=1 is selected to be replaced regardless of whether the use flag U is 0 or 1. Through this, as shown in FIGS. 14A and 14B, it is possible to reduce the occurrence of cache misses due to infrequently-accessed data remaining in the cache memory.

As has been described thus far, with the cache memory according to the present embodiment, by employing the Pseudo-LRU method which uses a 1-bit use flag instead of the data that indicates the access order in the conventional LRU method, the access order data may be a 1-bit flag; because the data amount of the access order data is small and updating is easy, it is possible to reduce hardware dimensions.

Additionally, W=1 is set for a cache entry that will be used no more, and the cache entry where W=1 is selected next for replacement; therefore, it is possible to reduce the occurrence of cache misses due to infrequently-accessed data remaining in the cache memory.

<Variations>

Figure 17:
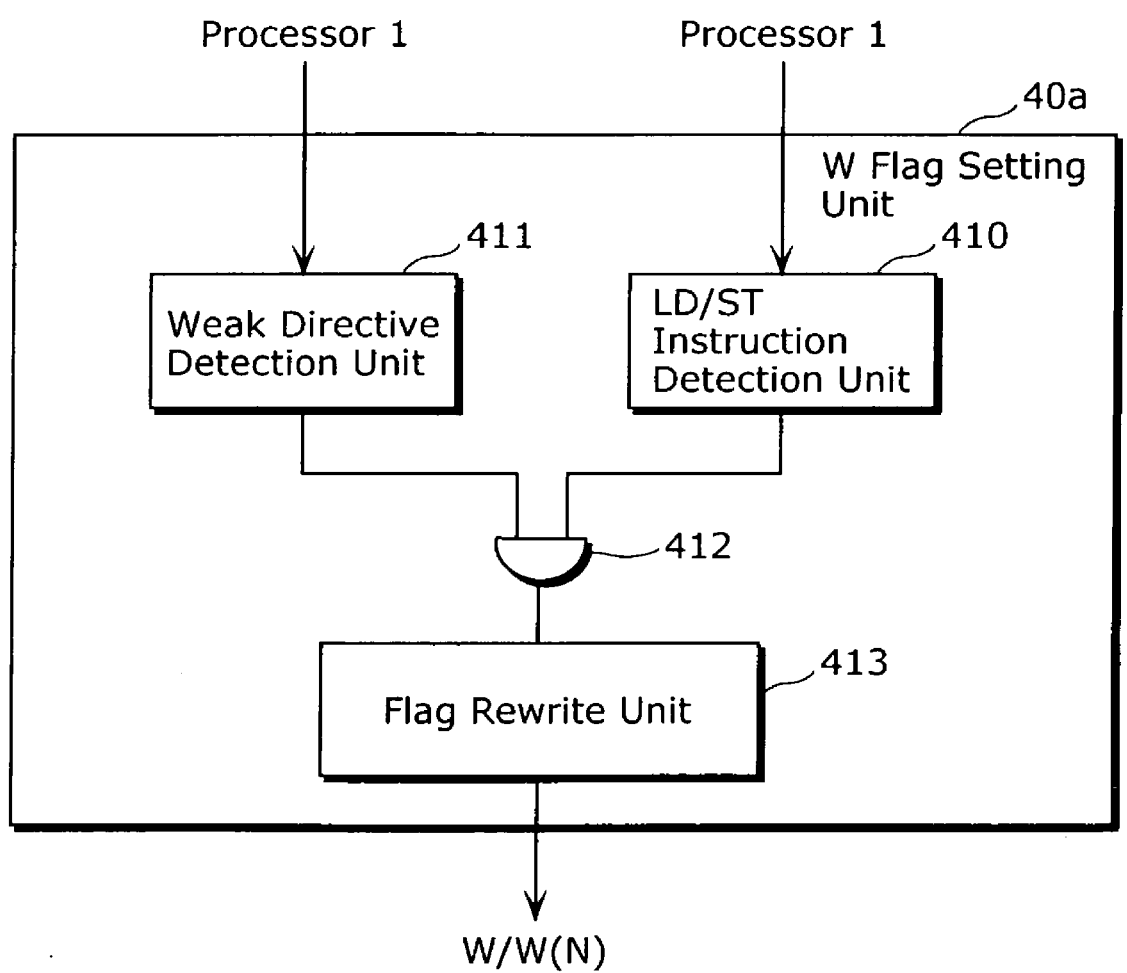
FIG. 17 is a diagram showing another example of a structure of a W flag setting unit.

(1) In each above embodiment, the configuration may be such as follows: the processor 1 executes a load/store instruction (hereafter, abbreviated as W-L/S instruction) that accesses data while setting the weak flag W at 1, and, upon detecting the execution of the W-L/S instruction, the control unit 38 or the control unit 138 sets the W flag at 1 immediately after access due to the W-L/S instruction. FIG. 17 is a diagram showing an example of a configuration of a W flag setting unit 40a included in the control unit 38 or 138 in this case.

In this diagram, the W flag setting unit 40a includes: a LD/ST instruction detection unit 410; a weak directive detection unit 411; an AND circuit 412; and a flag rewrite unit 413.

The LD/ST instruction detection unit 410 detects the processor 1 executing the load/store instruction. The weak directive detection unit 411 detects whether or not a weak directive has been outputted by the processor 1 at the time of the load/store instruction execution. The weak directive can be detected by a signal line from the processor 1. The AND circuit 412 notifies the flag rewrite unit 413 of the detection of the W-S/L instruction when the load/store instruction execution is detected and the weak directive is detected. The flag rewrite unit 413 sets the weak flag W for a cache entry that holds data accessed due to the W-L/S instruction at 1 when the W-L/S instruction is detected.

(2) In addition, the W flag setting unit 40a in the above (1) may take on a configuration in which the order data that indicates the access order is directly modified, rather than using the weak flag W, in the case where the control unit 38 of the first embodiment is included. In such a case, the weak directive detection unit 411 detects a number (Nth) that indicates the access order that should be set, from the processor 1 that executes the load/store instruction that includes the number of the access order to be set. In the case of four-way set associative, Nth may be any of from 1 to 4 (or from 0 to 3). For example, with N=4 as the oldest for infrequently-accessed data, the processor 1 can specify N=1 or N=2 for the infrequently-accessed data. The flag rewrite unit 413 modifies, to number N, the order data of the cache entry that holds the data accesses by the load/store instruction that includes the specification of the access order. In this manner, the configuration may be one in which the order data is directly modified to an arbitrary number N.

Figure 18:
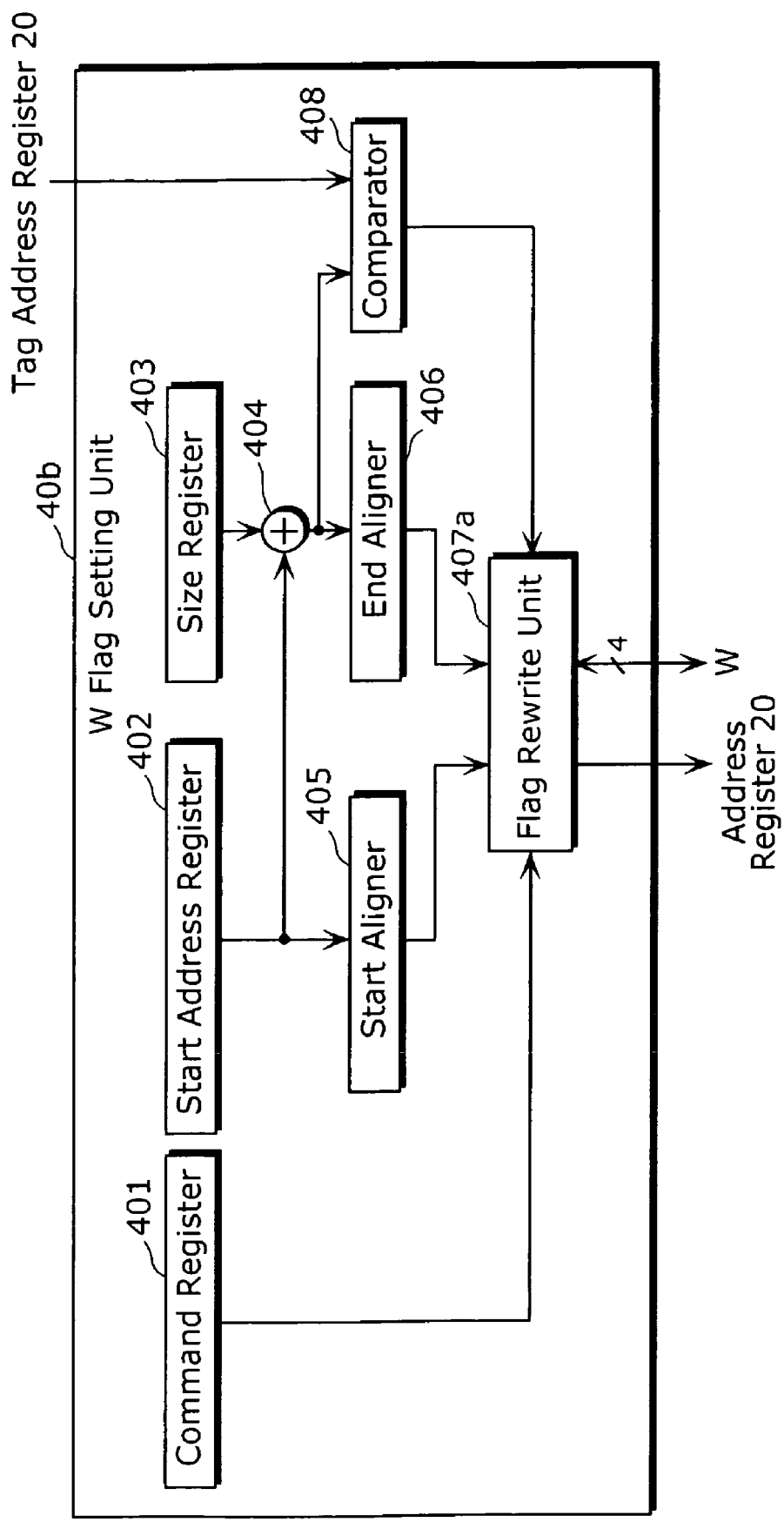
FIG. 18 is a diagram showing yet another example of a structure of a W flag setting unit.

(3) The configuration may be one in which the W flag setting unit 40 shown in FIG. 5 is replaced with the W flag setting unit 40b shown in FIG. 18. The W flag setting unit 40b has added a comparator 408 to the configuration of the W flag setting unit 40, and includes a flag rewrite unit 407a in place of the flag rewrite unit 407. The comparator 408 judges whether or not a line address of an end line outputted by the adder 404 matches with a line address held in a tag address register 20, outputted from the flag rewrite unit 407a for weak flag setting. This comparator 408 is used in judgment of the end address in the loop 1 of the W flag setting processing shown in FIG. 8. That is, the flag rewrite unit 407a stops setting of the weak flag in the case where the comparator judges a match.

(4) Each command shown in FIGS. 6A, 6B, and 6C may be inserted within a program by a compiler. At this time, the compiler may insert each of these commands in program positions that will no longer be written to, such as writing of array data, writing of block data for decoding compressed video data, and so on.

INDUSTRIAL APPLICABILITY

The present invention is applicable to a cache memory that speeds up memory access; for example, an on-chip cache memory, an off-chip cache memory, a data cache memory, a command cache memory, and the like.

The invention claimed is:

1. A cache memory which holds, for each cache entry, order data indicating an access order, and which replaces a cache entry that is oldest in the access order, the cache entry holding unit data for caching, comprising:
a modifier that modifies the order data regardless of an actual access order; and
a selector that selects, based on the modified order data, a cache entry to be replaced,
wherein said modifier attaches, to the modified order data, an oldest-order flag which indicates, when enabled, that the access order is the oldest regardless of the actual access order and which indicates that the cache entry to be replaced is written to no further,
wherein the cache entry to be replaced has, as the order data, a 1-bit order flag that indicates whether the cache entry to be replaced has been accessed since each cache entry had been reset, each cache entry being reset when a 1-bit order flag is enabled for each cache entry,
wherein said selector selects the cache entry to be replaced when a cache miss occurs and a cache entry having the oldest-order flag enabled is present, and
wherein said selector selects the cache entry to be replaced in accordance with the order data when the 1-bit order flag indicates that the cache entry to be replaced has been accessed since each cache entry had been reset and when the cache entry having the oldest-order flag unenabled is present.

2. The cache memory according to claim 1, wherein said modifier comprises:
a specifier that specifies a cache entry that holds data which is within an address range specified by a processor; and
an oldest-orderer that causes the order data of the specified cache entry to be oldest in the access order, regardless of the actual access order.

3. The cache memory according to claim 2, wherein said specificer comprises:
a first converter that converts a starting address of the address range to a start line address that indicates a starting line within the address range when the starting address indicates a midpoint in line data;
a second converter that converts an ending address of the address range to an end line address that indicates an ending line within the address range when the ending address indicates the midpoint in the line data; and
a judger that determines whether there is a cache entry that holds data corresponding to each line address from the start line address to the end line address.

4. The cache memory according to claim 1,
wherein said modifier modifies the order data so that one cache entry is indicated as an Nth cache entry in the access order, wherein
N is a number indicating one of: an oldest cache entry in the access order; a number indicating a newest cache entry in the access order; an Nth cache entry from the oldest in the access order; and an Nth cache entry from the newest cache entry in the access order.

5. The cache memory according to claim 1, wherein said modifier comprises:
an instruction detector that detects that a memory access instruction that includes a modification directive for the access order has been executed; and
a rewriter that rewrites the order data for a cache entry that is accessed due to the memory access instruction.

6. The cache memory according to claim 1, wherein said modifier comprises:
a holder that holds an address range specified by a processor;
a searcher that searches for a cache entry that holds data corresponding to the address range held in said holder; and
a rewriter that rewrites the order data so that the access order of the cache entry searched for by said searcher is an Nth cache entry in the access order.

7. A control method for controlling a cache memory which holds, in each cache entry, order data indicating an access order, and which replaces a cache entry that is oldest in the access order, the cache entry holding unit data for caching, said method comprising:
 modifying the order data regardless of an actual access order; and
 selecting, based on the modified order data, a cache entry to be replaced,
 wherein in said modifying, an oldest-order flag is attached to the modified order data which indicates, when enabled, that the access order is the oldest regardless of the actual access order and which indicates that the cache entry to be replaced is written to no further,
 wherein the cache entry to be replaced has, as the order data, a 1-bit order flag that indicates whether the cache entry to be replaced has been accessed since each cache entry had been reset, each cache entry being reset when a 1-bit order flag is enabled for each cache entry,
 wherein the cache entry to be replaced is selected when a cache miss occurs and a cache entry having the oldest-order flag enabled is present, and
 wherein the cache entry to be replaced is selected in accordance with the order data when the 1-bit order flag indicates that the cache entry to be replaced has been accessed since each cache entry had been reset and when the cache entry having the oldest-order flag unenabled is present.

8. A cache memory which holds, for each cache entry, order data indicating an access order, and which replaces a cache entry that is oldest in the access order, the cache entry holding unit data for caching, comprising: .
 an oldest-orderer that modifies the order data regardless of an actual access order, by attaching, to the order data, an oldest-order flag which indicate, when enabled, that the access order is the oldest regardless of the actual access order and which indicates that the cache entry to be replaced is written to no further; and
 a selector that selects, based on the modified order data, a cache entry to be replaced,
 wherein the cache entry to be replaced has, as the order data, a 1-bit order flag that indicates whether the cache entry to be replaced has been accessed since each cache entry had been reset, each cache entry being reset when a 1-bit order flag is enabled for each cache entry
 wherein said selector selects the cache entry to be replaced when a cache miss occurs and a cache entry having the oldest-order flag enabled is present, and
 wherein said selector selects the cache entry to be replaced in accordance with the order data when the 1-bit order flag indicates that the cache entry to be replaced has been accessed since each cache entry had been reset and when the cache entry having the oldest-order flag unenabled is present.

* * * * *